M. L. RICHARDS.
STEAM TRAP.
APPLICATION FILED NOV. 1, 1909.
977,131.
Patented Nov. 29, 1910.
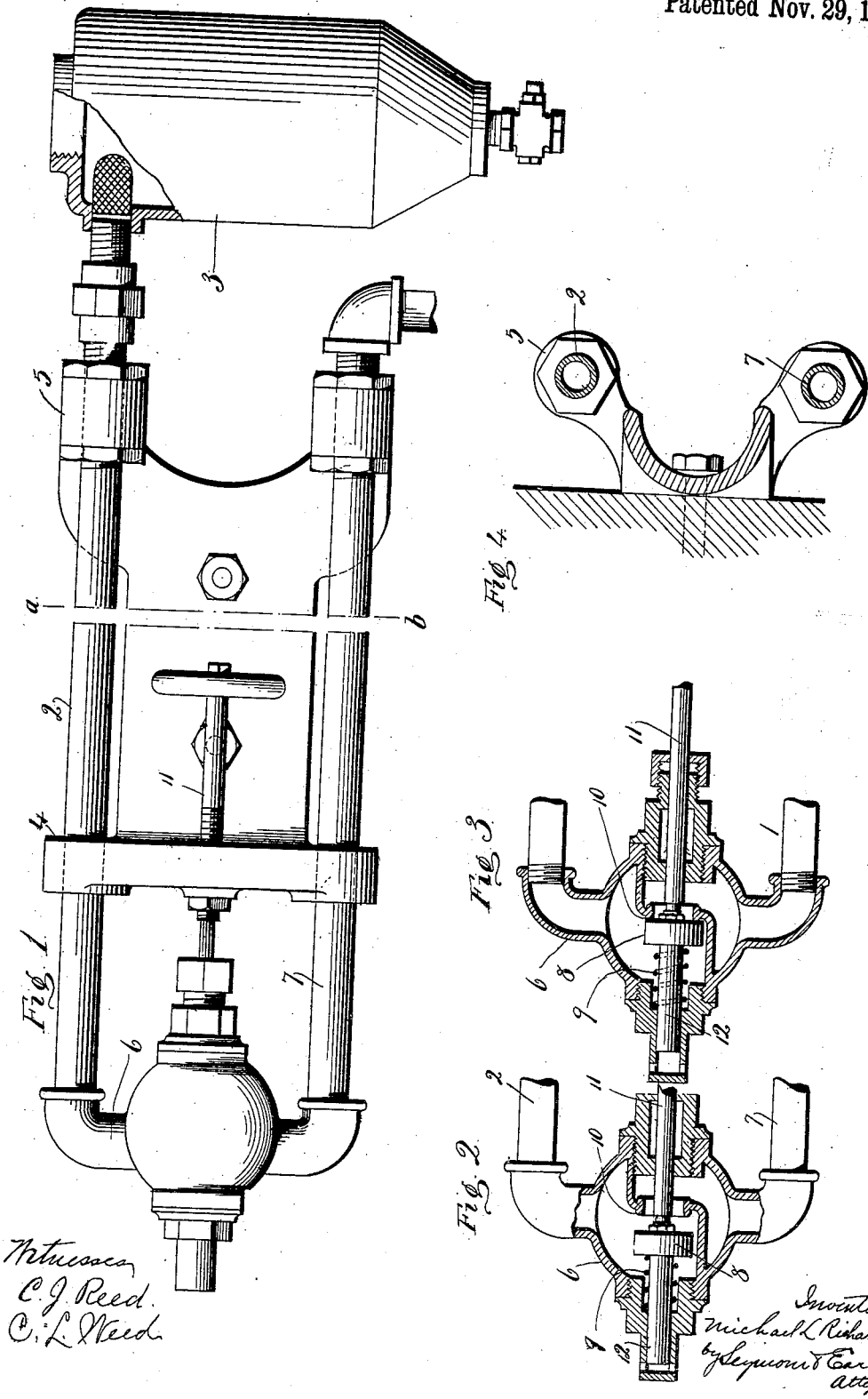

UNITED STATES PATENT OFFICE.

MICHAEL L. RICHARDS, OF NEW HAVEN, CONNECTICUT.

STEAM-TRAP.

977,131.   Specification of Letters Patent.   Patented Nov. 29, 1910.

Application filed November 1, 1909. Serial No. 525,790.

*To all whom it may concern:*

Be it known that I, MICHAEL L. RICHARDS, a citizen of the United States, residing at New Haven, in the county of New Haven and State of Connecticut, have invented a new and useful Improvement in Steam-Traps; and I do hereby declare the following, when taken in connection with the accompanying drawings and the letters of reference marked thereon, to be a full, clear, and exact description of the same, and which said drawings constitute part of this specification and represent, in—

Figure 1 a plan view of a steam trap embodying my invention. Fig. 2 a sectional view of the valve mechanism shown in open position. Fig. 3 a similar sectional view showing the valve closed. Fig. 4 a sectional view on the line *a—b* of Fig. 1.

This invention relates to an improvement in steam traps designed to release water from condensation, the object being the provision of an automatically controlled valve which does not require a float or water seal to check the steam from escaping, one readily placed in position and not liable to get out of adjustment, one which requires but slight space and in which the possibility of freezing is avoided, as well as many other advantages too numerous to mention; and the invention consists in the construction hereinafter described and particularly recited in the claims.

In carrying out my invention I employ what I will term an inlet pipe 2 preferably formed from copper so as to expand and contract to a certain extent, although pipes of other material may be employed. This pipe 2 which leads from the separator 3 is rigidly mounted in a bearing 5 firmly secured to a wall or other convenient point, and this pipe passes freely through the bearing 4 formed integral with the bearing 5 so that under expansion or contraction the pipe 2 will move back or forth through the bearing 4. Secured to the outer end of the pipe 2 is a valve 6 which valve is also connected with a discharge pipe 7, and this pipe 7, like the pipe 2, freely passes through the bearing 4 and is firmly secured at the opposite end in the bearing 5. The valve 6 contains a movable plug 8 actuated by a spring 9 so as to be pressed against a valve-seat 10 to close the passage between the pipe tube 2 and the discharge pipe 7. Mounted in a suitable casing and may be one of the bearings 4, is a spindle 11 longitudinally adjustable and extending into the valve casing 6 in line with the plug 8 which plug is so mounted on the valve stem 12 that the end of the stem projects beyond the face of the plug 8 so as to be engaged by the spindle 11.

When the valve is closed the valve-casing 8 by the contraction of the tube 2 is drawn toward the spindle 11 and so that the spindle 11 engaging with the valve stem 12 will open the valve as shown in Fig. 2 of the drawings; and in this position any water in the pipe 2 may escape through the pipe 7. As soon, however, as steam enters the pipe 2 the heat thereof will expand the pipes 2 and 7 so as to move the valve-casing 6 away from the spindle 11, and as it moves away from the end of this spindle the spring 9 forces the plug 8 against the seat 10 so as to close the valve, thus preventing steam from escaping through the pipe 7. When the pressure of steam in the pipe 2 is reduced, or if water accumulates and this water cools, it will contract the pipes 2 and 7 so as to open the valve and allow the water to escape. This spindle 11 is readily adjustable, but after being once set for any particular place will not need further attention. I thus provide a valve which requires but little space, and one in which scale is not liable to enter so as to choke the valve, and a valve which is not liable to be affected by freezing as it is opened when the parts are cold so that any water therein may escape.

I claim:—

1. A steam trap comprising longitudinally expansible inlet and outlet pipes, bearings to which one end of said pipes is rigidly connected and through which the opposite ends may be moved longitudinally, a valve connected with the free ends of said pipes, said valve including a spring-actuated plug and a fixed spindle entering said valve in line with said plug and adapted when the pipes contract to engage with said plug and cause the valve to open.

2. A steam trap comprising longitudinally movable inlet and outlet pipes, a bearing in which one end of said pipes is rigidly mounted and in which the opposite ends are supported for longitudinal movement, a valve between the outer ends of said pipes, said valve including a spring-actuated plug, a fixed spindle entering said valve in line with said plug and adapted when the inlet pipe contracts to engage with said plug and cause
5 the valve to open, and a separator connected with the fixed end of the inlet pipe.

In testimony whereof, I have signed this specification in the presence of two subscribing witnesses.

MICHAEL L. RICHARDS.

Witnesses:
 FRANK MANCENY,
 MICHELE C. MANCINI.